US009740425B2

(12) United States Patent
Bakshi et al.

(10) Patent No.: US 9,740,425 B2
(45) Date of Patent: Aug. 22, 2017

(54) TAG-BASED WEAR LEVELING FOR A DATA STORAGE DEVICE

(71) Applicant: SANDISK TECHNOLOGIES INC., Plano, TX (US)

(72) Inventors: Swati Bakshi, Dublin, CA (US); Nian Niles Yang, Mountain View, CA (US); Alexei Naberezhnov, San Jose, CA (US); Xinde Hu, San Diego, CA (US)

(73) Assignee: SanDisk Technologies LLC, Plano, TX (US)

(*) Notice: Subject to any disclaimer, the term of this patent is extended or adjusted under 35 U.S.C. 154(b) by 0 days.

(21) Appl. No.: 14/572,693

(22) Filed: Dec. 16, 2014

(65) Prior Publication Data
US 2016/0170682 A1 Jun. 16, 2016

(51) Int. Cl.
G06F 3/06 (2006.01)

(52) U.S. Cl.
CPC .......... *G06F 3/0649* (2013.01); *G06F 3/0616* (2013.01); *G06F 3/0679* (2013.01)

(58) Field of Classification Search
CPC ............ G06F 12/0246; G06F 12/0253; G06F 3/0679; G06F 3/0688; G06F 3/0604; G06F 3/0616; G06F 3/064; G06F 3/081; G06F 3/0644; G06F 3/0653; G06F 2212/7211; G06F 2212/2022; G06F 2212/1036; G06F 2212/7205; G06F 2212/214; G06F 2212/222; G06F 3/0649
See application file for complete search history.

(56) References Cited

U.S. PATENT DOCUMENTS

| | | | |
|---|---|---|---|
| 7,924,587 B2 * | 4/2011 | Perlmutter .......... | G11C 11/5628 365/185.03 |
| 2010/0199020 A1 | 8/2010 | Lin et al. | |
| 2012/0054414 A1 | 3/2012 | Tsai et al. | |
| 2013/0054878 A1 * | 2/2013 | Lee ..................... | G06F 12/0246 711/103 |
| 2013/0083589 A1 * | 4/2013 | Or-Bach .............. | G11C 11/406 365/149 |
| 2013/0145079 A1 | 6/2013 | Lee et al. | |
| 2013/0191700 A1 * | 7/2013 | Griffin ................. | G06F 11/008 714/759 |
| 2013/0311705 A1 * | 11/2013 | Cheng ................ | G06F 12/0246 711/103 |
| 2014/0082259 A1 * | 3/2014 | Yeh .................... | G06F 12/0246 711/103 |
| 2015/0026389 A1 * | 1/2015 | Li ....................... | G06F 12/0246 711/103 |
| 2015/0067415 A1 * | 3/2015 | Miyamoto ........... | G06F 11/073 714/704 |
| 2016/0004464 A1 * | 1/2016 | Shen .................... | G06F 3/0619 711/103 |

\* cited by examiner

*Primary Examiner* — Hiep Nguyen
(74) *Attorney, Agent, or Firm* — Toler Law Group, PC

(57) ABSTRACT

A data storage device includes a memory. A method includes de-allocating a first region of a group of regions of the memory during a wear leveling process based on a determination that the first region is associated with a first tag of a set of tags. Each region of the group of regions is assigned to a tag of the set of tags based on a health metric associated with the region. The health metric is based on a bit error rate (BER), a program/erase cycle (PEC) count, a PEC condition metric, or a combination thereof. In response to selecting the first region, information is copied from the first region to a second region of the memory during the wear leveling process.

20 Claims, 7 Drawing Sheets

TAG-BASED WEAR LEVELING FOR A DATA STORAGE DEVICE

FIELD OF THE DISCLOSURE

This disclosure is generally related to data storage devices and more particularly to wear leveling for data storage devices.

BACKGROUND

Non-volatile storage devices have enabled increased portability of data and software applications. During operation of a storage device, data may be programmed to the storage device, read from the storage device, and erased from the storage device. As a storage device is used, the storage device may be subject to physical wear that increases data errors at the storage device. For example, multiple program/erase cycles (PECs) may cause physical wear to storage elements of a storage device, resulting in more errors during reading of data from the storage elements of the storage device. In some cases, physical wear can cause a number of errors of data to exceed an error correction capability associated with an encoding technique used to encode the data.

To reduce or avoid data loss, storage devices may use wear leveling to distribute wear among regions of a memory. For example, a storage device may relocate data from one region to another region. Relocating the data may "distribute" wear among regions of the storage device (e.g., so that the regions have a similar or the same number of PECs). However, in some cases, programming and erasing regions a similar number of times may not result in the regions wearing at the same rate. For example, as process technologies improve, device component sizes may be reduced. In some cases, smaller process technologies may increase differences in operation between storage device regions, such as by causing some storage device regions to operate "better" than other storage device regions.

To further illustrate, a first region of a storage device may have a greater PEC endurance than a second region of a storage device (e.g., the first region may be a "strong" region, and the second region may be a "weak" region). In this case, the first region may have a better physical condition than the second region even after a greater number of PECs at the first region. In some circumstances, using PECs to approximate wear at the first region and the second region may lead to data loss and to unusable memory storage elements. For example, data loss can result at a region if wear leveling is performed too late, such as when an error rate of data stored at a "weak" region exceeds an error correction capability associated with an encoding technique used to encode the data.

SUMMARY

A data storage device may include a memory. The data storage device may be configured to perform tag-based wear leveling at the memory. To illustrate, regions (e.g., blocks) of the memory may be associated with a set of tags. Each of the tags may indicate a status (e.g., a health status) of one or more of the regions. The data storage device may select a first region for a wear leveling process at the memory by identifying a particular tag of the set of tags, such as a numerically lowest tag (e.g., Tag 1). The numerically lowest tag may indicate a relative "age" of data stored at the first region, such as by indicating that the data is less frequently accessed than data stored at the other regions of the memory. Regions of the memory may be assigned to the tags based on any of multiple parameters, such as based on a health metric of a region. To illustrate, the health metric may be determined using a number of program/erase cycles (PECs), a bit error rate (BER), and/or a PEC condition (e.g., a programming voltage). Thus, a tag may more accurately indicate health of a block than a number of PECs, and tag-based wear leveling may enable selection based on an indication of healthy blocks as compared to wear leveling techniques that are initiated based only on a number of PECs. Accordingly, infrequently accessed data may be relocated from "cold" regions to "hot" regions to distribute wear throughout the memory.

In some implementations, tags may be used for other operations at the data storage device, such as programming operations to write information at the memory and/or sensing operations to access the information from the memory. For example, a tag associated with a region may determine a programming voltage used to program data at the region in connection with a tag-based programming process. As a region "ages," the region may be associated with another tag. For example, as the first region is subject to physical wear, the first region may be assigned to a numerically higher tag (e.g., from Tag 1 to Tag 2) as health of the first region decreases. In response to assigning the first region to the numerically higher tag, a programming signal used to write data at the first region may be adjusted (e.g., by increasing a voltage of pulses of the programming signal or a number of pulses of the programming signal). The adjusted programming signal may increase separation of distributions of states representing information stored at the memory, thus increasing read margin (and decreasing errors) as the data storage device ages.

DETAILED DESCRIPTION

Figure 1:
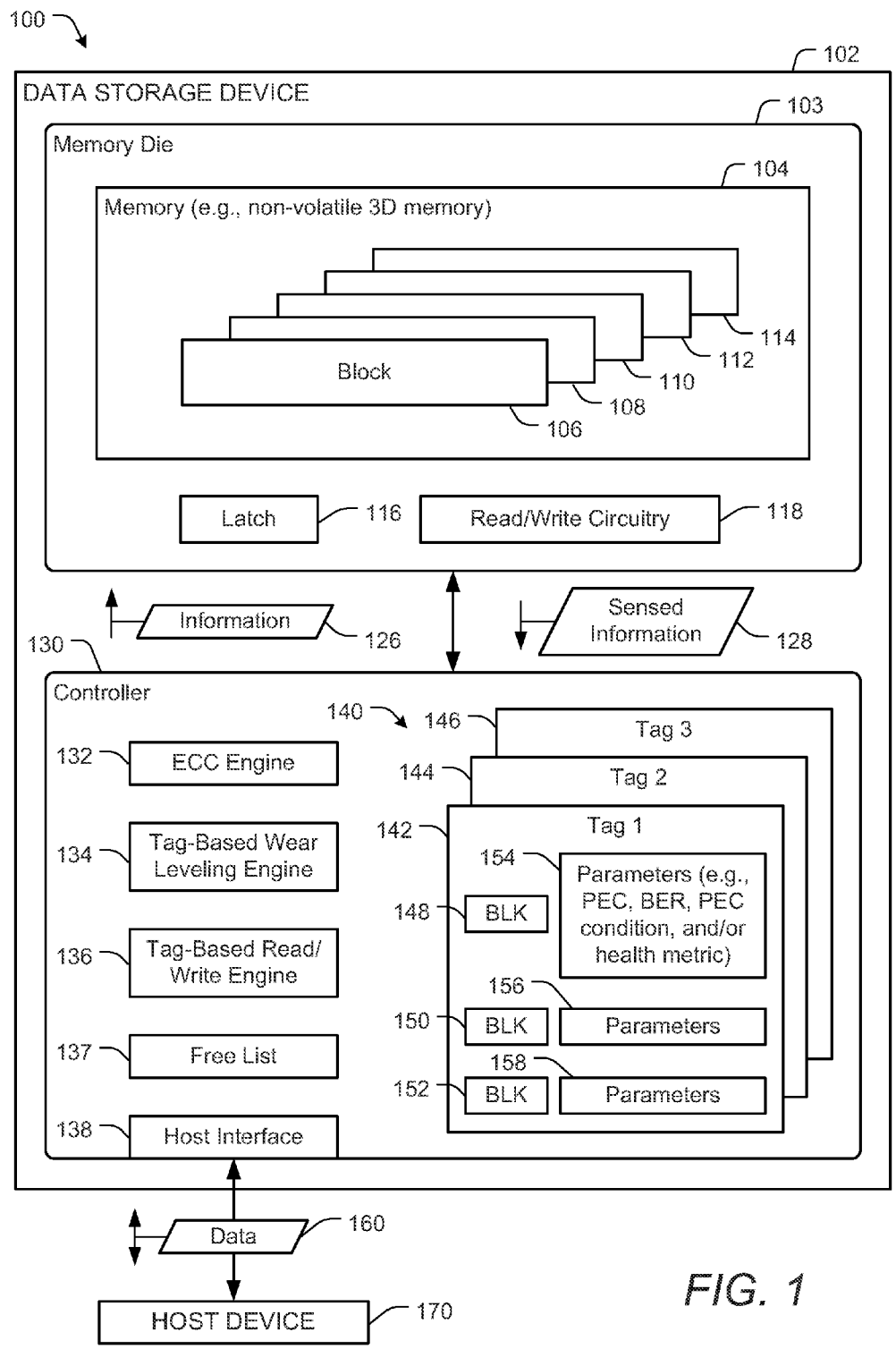
FIG. 1 is a block diagram of a particular illustrative embodiment of a system including a data storage device that may be configured to perform a tag-based wear leveling process.

Referring to FIG. 1, an illustrative example of a system is depicted and generally designated 100. The system 100 includes a data storage device 102 and a host device 170.

The data storage device 102 and the host device 170 may be operationally coupled via a connection, such as a bus or a wireless connection. The data storage device 102 may be embedded within the host device 170, such as in accordance with a Joint Electron Devices Engineering Council (JEDEC) Solid State Technology Association Universal Flash Storage (UFS) configuration. Alternatively, the data storage device 102 may be removable from the host device 170 (i.e., "removably" coupled to the host device 170). As an example, the data storage device 102 may be removably coupled to the host device 170 in accordance with a removable universal serial bus (USB) configuration.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, the data storage device 102 may be coupled to the host device 170 via a network. For example, the network may include a data center storage system network, an enterprise storage system network, a storage area network, a cloud storage network, a local area network (LAN), a wide area network (WAN), the Internet, and/or another network.

The data storage device 102 may include a memory die 103 and a controller 130. The memory die 103 and the controller 130 may be coupled via one or more buses, one or more interfaces, and/or another structure. An interface may be wired (e.g., a bus structure) or wireless (e.g., a wireless communication interface). Although FIG. 1 depicts a single memory die (the memory die 103) for convenience, it should be appreciated that the data storage device 102 may include another number of memory dies corresponding to the memory die 103 (e.g., two memory dies, eight memory dies, or another number of memory dies). Further, although FIG. 1 illustrates that the data storage device 102 includes the controller 130, in other implementations the memory die 103 may be directly coupled to the host device 170 (e.g., the host device 170 may include a controller or other device that accesses the memory die 103).

The memory die 103 includes a memory 104, such as a non-volatile memory. For example, the memory 104 may include a flash memory, such as a NAND flash memory, or a resistive memory, such as a resistive random access memory (ReRAM), as illustrative examples. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration that includes multiple memory dies).

The memory 104 may include one or more regions of storage elements (also referred to herein as memory cells). An example of a region of storage elements is a block, such as a NAND flash erase group of storage elements. To illustrate, the memory 104 may include a representative block 106. The memory 104 may include one or more additional blocks, such as blocks 108, 110, 112, and 114. Although FIG. 1 depicts five blocks for illustration purposes, it should be appreciated that the memory 104 may include any number of blocks that is suitable for the particular application (e.g., several hundred blocks, or another number of blocks).

Each of the blocks 106, 108, 110, 112, and 114 may include a plurality of bit lines and a plurality of word lines connecting storage elements. A word line may function as a single-level-cell (SLC) word line or as a multi-level-cell (MLC) word line (such as a three-bit-per-cell word line or a two-bit-per-cell word line, as illustrative examples). Each storage element accessible by a word line may be programmable to a state (e.g., a threshold voltage in a flash configuration or a resistive state in a resistive memory configuration) that indicates one or more bit values.

The memory die 103 may further include one or more latches (e.g., one or more data latches and/or one or more control latches). For example, the memory die 103 may include a latch 116. The latch 116 may correspond to a data latch that is configured to receive information from the controller 130 for write operations to the memory 104. FIG. 1 also illustrates that the memory die 103 may include read/write circuitry 118. The read/write circuitry 118 may be coupled to the latch 116. The latch 116 and the read/write circuitry 118 may be associated with operation of storage elements of the memory 104 (e.g., read and write operations to storage elements of the memory 104).

The controller 130 may include an error correcting code (ECC) engine 132, a tag-based wear leveling engine 134, a tag-based read/write engine 136, and a host interface 138. The controller 130 may further store a free list 137, such as a free block list (FBL) that indicates available (e.g., de-allocated) regions of the memory 104. The controller 130 may be coupled to the host device 170 via the host interface 138.

The controller 130 is configured to receive data and instructions from the host device 170 and to send data to the host device 170. For example, the controller 130 may receive data 160 from the host device 170 via the host interface 138 and may send data 160 to the host device 170 via the host interface 138.

The controller 130 is configured to send data and commands to the memory 104 and to receive data from the memory 104. For example, the controller 130 is configured to send data and a write command to cause the memory 104 to store the data to a specified address of the memory 104. The write command may specify a physical address of a portion of the memory 104 that is to store the data. The controller 130 is configured to send a read command to the memory 104 to access data from a specified address of the memory 104. The read command may specify the physical address of a portion of the memory 104.

The ECC engine 132 may be configured to receive data and to generate one or more ECC codewords based on the data. The ECC engine 132 may include a Hamming encoder, a Reed-Solomon (RS) encoder, a Bose-Chaudhuri-Hocquenghem (BCH) encoder, a low-density parity check (LDPC) encoder, a turbo encoder, an encoder configured to encode data according to one or more other ECC schemes, or a combination thereof. The ECC engine 132 may be configured to decode data accessed from the memory 104. For example, the ECC engine 132 may be configured to decode data accessed from the memory 104 to detect and correct one or more errors that may be present in the data, up to an error correcting capacity of the particular ECC scheme. The ECC engine 132 may include a Hamming decoder, an RS decoder, a BCH decoder, an LDPC decoder, a turbo decoder, a decoder configured to decode data according to one or more other ECC schemes, or a combination thereof.

The host device 170 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The host device 170 may communicate via a host controller, which may enable the host device 170 to communicate with the data storage device 102. The host device 170 may operate in compliance with a JEDEC Solid State Technology Association industry specification, such as an embedded MultiMedia Card (eMMC) specification or a Universal Flash Storage (UFS) Host Controller Interface specification. The host device 170 may operate in compliance with one or more other specifications, such as a Secure Digital (SD) Host Controller specification as an illustrative example. Alternatively, the host device 170 may communicate with the data storage device 102 in accordance with another communication protocol. In some implementations, the system 100, the data storage device 102, or the memory 104 may be integrated within a network-accessible data storage system, such as an enterprise data system, an NAS system, or a cloud data storage system, as illustrative examples.

During operation, the controller 130 may initiate write operations, read operations, and/or erase operations at the memory 104. The controller 130 may receive data 160 and a request for write access to the memory 104 from the host device 170 in connection with a write operation. The controller 130 may input the data 160 to the ECC engine 132. The ECC engine 132 may encode the data 160 to generate information 126 (e.g., one or more ECC codewords). The controller 130 may send the information 126 to the memory die 103 for storage at the memory 104 (e.g., by storing the information 126 to the latch 116).

The memory die 103 may access the information 126 at the latch 116 and may cause the read/write circuitry 118 to store the information 126 at the memory 104. For example, the read/write circuitry 118 may apply a programming signal having a particular voltage and a particular number of programming pulses to storage elements of the memory 104. The particular voltage and/or the particular number of programming pulses may be specified by the controller 130 (e.g., by issuing a command to the read/write circuitry 118 specifying the particular voltage and/or the particular number of programming pulses). In a particular embodiment, the particular number of programming pulses may be selected from a range of programming pulses. As a non-limiting illustrative example, the range may be from 5 to 25 programming pulses, and the particular number of programming pulses may be equal to 5, 10, 15, 20, or 25, as illustrative examples.

In accordance with the present disclosure, the controller 130 may initiate tag-based write processes using the tag-based read/write engine 136. The tag-based read/write engine 136 may assign regions of the memory to a set of tags 140 (e.g., a first tag 142, a second tag 144, and a third tag 146). To illustrate, in response to programming information to a region of the memory 104, the tag-based read/write engine 136 may assign the region to a particular tag of the set of the tags 140. As an example, if the data storage device 102 programs the information 126 to the block 106 in connection with a first programming operation to the block 106, the tag-based read/write engine 136 may assign the block 106 to the first tag 142. As another example, in response to programming information to the blocks 108, 110, 112, and 114, the tag-based read/write engine 136 may assign the blocks 108, 110, 112, and 114 to one or more tags of the set of tags 140. Although FIG. 1 depicts three tags (the tags 142, 144, and 146) for illustration, it should be appreciated that the data storage device 102 may include another number of tags (e.g., 8 tags, 16 tags, 32 tags, or 64 tags, as illustrative examples).

The first tag 142 may include block indications 148, 150, and 152. Each of the block indications 148, 150, and 152 may identify a particular block of the memory 104. As an illustrative example, the block indication 148 may identify an index value associated with the block 106, the block indication 150 may identify an index value associated with the block 108, and the block indication 150 may identify an index value associated with the block 110. Although FIG. 1 illustrates example details of one tag (the first tag 142), it should be appreciated that one or more other tags (e.g., the tags 142, 144) may be as described with reference to the first tag 142.

During a read operation, the controller 130 may cause the memory die 103 to access information from the memory 104. To illustrate, the controller 130 may receive a request for read access from the host device 170 to access the data 160. In response to receiving the request for access to the data 160, the controller 130 may send a command to the memory die 103 specifying an address associated with the information 126. The memory die 103 may cause the read/write circuitry 118 to sense information from the addressed storage element to generate sensed information 128. The memory die 103 may provide the sensed information 128 to the controller 130 via the latch 116. The controller 130 may decode the sensed information 128 using the ECC engine 132 to generate the data 160, and the controller 130 may provide the data 160 to the host device 170 via the host interface 138. In some circumstances, one or more values of the sensed information 128 may differ from the values of the information 126, such as due to read errors or other errors. As the memory 104 is subject to more PECs, information sensed from the memory 104 may include a greater number of errors (e.g., due to physical wear to storage elements of the memory 104 caused by PECs).

To perform an erase operation, the controller 130 may erase information from the memory 104, such as by causing the memory die 103 to apply an erase voltage to storage elements of one or more blocks of the memory 104 in connection with a NAND flash implementation. To illustrate, in connection with a storage reclamation process, the controller 130 may cause the memory die 103 to copy valid data from the blocks 106, 108 to the block 110 (e.g., to consolidate the valid data at the block 110). The controller 130 may then cause the memory die 103 to erase the blocks 106, 108.

The controller 130 may be configured to modify one or more tags of the set of tags 140, such as in connection with read operations, write operations, and/or erase operations at the memory 104. For example, the controller 130 may determine an error metric associated with the sensed information 128 while decoding the sensed information 128, such as a bit error rate (BER). The controller 130 may modify parameters 154 associated with the block 106, such as by modifying the parameters 154 to indicate the BER. The parameters 154 may indicate one or more BERs associated with a block identified by the block indication 148. For example, the parameters 154 may indicate one or more BERs associated with portions (e.g., word lines) of the block 106, a "global" BER of the block 106 (e.g., a weighted average BER of portions of the block 106, such as a time-weighted average), or a combination thereof. Alternatively or in addition, the parameters 154 may indicate a number (or estimated number) of program/erase cycles (PECs) at the block 106 and/or a PEC condition at the block 106 during programming of information at the block 106. An example of a PEC condition is a particular programming signal applied to program information at a block. To illustrate, the parameters 154 may indicate that a particular number of programming pulses was used to write information (e.g., the information 126) to the block 106.

The tag 142 may further indicate parameters 156 corresponding to a block identified by the block indication 150 and may further indicate parameters 158 corresponding to a block identified by the block indication 152. As an illustrative example, the parameters 156 may indicate one or more BERs associated with portions (e.g., word lines) of the block 108, a "global" BER of the block 108 (e.g., an average BER of portions of the block 108, such as a time-weighted average), a number (or estimated number) of PECs at the block 108, and/or a PEC condition at the block 108 during programming of information at the block 108. As another illustrative example, the parameters 158 may indicate one or more BERs associated with portions (e.g., word lines) of the block 110, a "global" BER of the block 110 (e.g., an average BER of portions of the block 110, such as a time-weighted average), a number (or estimated number) of PECs at the block 110, and/or a PEC condition at the block 110 during programming of information at the block 110.

As an illustrative example, the parameters 154, 156, and 158 may indicate health associated with blocks identified by the block indications 148, 150, and 152. Health of a region may be determined based on one or more parameters, such as BER, PEC, and/or PEC condition. For example, a health metric h associated with a region (e.g., the block 106) may be determined according to h=BER/BER_cap+PEC/PEC_cap+PECC/PECC_cap. In this example, BER may indicate a bit error rate associated with a region (e.g., a number of errors corrected during decoding of an ECC codeword accessed from the region, such as a number of errors corrected during decoding of the sensed information 128), BER_cap may indicate an error correction capability (e.g., a "maximum" number of bits that can be corrected by the ECC engine 132 for a particular ECC codeword), PEC may indicate a number of PECs of the region, PEC_cap may indicate an expected "maximum" number of tolerable PECs at the region, PECC may indicate a number of programming pulses of a programming signal used to write information to the region, and PECC_cap may indicate a "maximum" number of programming pulses available to write information to the region. As a non-limiting illustrative example, if BER=50, BER_cap=200, PEC=100, PEC_cap=1,000, PECC=5, and PECC_cap=25, then h=50/200+100/1,000+5/25=0.55.

To further illustrate, the health metric h may be defined for a range of numbers, such as for 0≤h≤10, as an illustrative example. In this example, h=0 may correspond to a condition in which the data storage device 102 is "young" or "fresh" (i.e., when the memory 104 is healthy), and h=10 may correspond to a condition in which the data storage device 102 is "old" (i.e., when the memory 104 is unhealthy, such as after a high degree of physical wear). Depending on the particular implementation, a region of the memory 104 may be assigned to one of the tags 140 based on the value of the health metric h for the region (e.g., with 0≤h<1 corresponding to the first tag 142, 1≤h<2 corresponding to the second tag 144, 2≤h<3 corresponding to the third tag 146, and 3≤h≤10 corresponding to one or more other tags of the set of tags 140, as a non-limiting illustrative example).

In response to one or more read operations, programming operations, and/or erase operations at a region of the memory 104, the controller 130 may re-determine the health metric h of the region. In a particular embodiment, the controller 130 is configured to update the set of tags 140 in response to re-determining the health metric h of a region. As an illustrative example, if one or more read operations, programming operations, and/or erase operations to the block 106 cause the health metric h of the block 106 to change, the controller 130 may update to the parameters 154 to indicate the changed health metric h of the block 106 (e.g., from 0.55 to 1.05, as an illustrative example).

The controller 130 may be configured to reassign regions of the memory 104 to tags of the set of tags 140. As an illustrative example, for each region, the controller 130 may reassign the region from one tag to another tag of the set of tags 140 based on health of the region. In this example, the set of tags 140 may be ordered sequentially, and a region may "progress" from one tag to another tag (e.g., from the first tag 142 to the second tag 144 and/or from the second tag 144 to the third tag 146) based on health of the region (or based on a change in health of the region). To illustrate, a region (e.g., the block 106) may be reassigned from the first tag 142 to the second tag 144 in response to the health metric h of the region satisfying a threshold, such as h≥1, as an illustrative example. Alternatively or in addition, the region may be reassigned from the first tag 142 to the second tag 144 in response to a change of the health metric (Δh) of the region satisfying a threshold (e.g., Δh≥0.5, as an illustrative example). Continuing with the previous non-limiting illustrative example, if the controller 130 re-determines the health metric h of the block 106 to be h=1.05, then Δh=1.05−0.55=0.5. In this example, the controller 130 may reassign the block 106 from the first tag 142 to the second tag 144 (because Δh=≥0.5).

In a particular implementation, use of a threshold number of tags of the set of tags 140 may cause the controller 130 to set a tag "floor." For example, if a threshold number of regions of the memory 104 are assigned to the second tag 144, the second tag 144 may function as a tag "floor" (and one or more other regions of the memory 104 may be reassigned from the first tag 142 to the second tag 144). As another example, if a threshold number of regions of the memory 104 are assigned to the third tag 146, the third tag 146 may function as a tag "floor" (and one or more other regions of the memory 104 may be reassigned from the second tag 144 to the third tag 146). The tag floor may be enforced on a per-die basis. For example, the tag floor may apply to each region of one die of the memory 104 (e.g., the memory die 103) but may not apply to another die that may be included in the memory 104 (e.g., the other die may be associated with a different tag floor or with no tag floor).

Each tag of the set of tags 140 may statistically indicate an approximate duration that the information has been stored at a region of the memory 104. To illustrate, if the block 106 is associated with the first tag 142, then information at the block 106 (e.g., the information 126) is statistically expected to have been stored at the block for a relatively short duration (e.g., the information may be "hot"). As the block 106 is subject to more read, write, and erase operations, then the health metric h is likely to increase and the block 106 is likely to be reassigned from the first tag 142 to another tag (e.g., the second tag 144 or the third tag 146). Similarly, if the blocks 108, 110, and 112 are subject to PECs, then the blocks 108, 110, 112 may be reassigned from the first tag 142 to the second tag 144 and/or from the second tag 144 to the third tag 146. If a region of the memory 104 is associated with a numerically lower tag than other regions of the memory 104, then information stored at the region may be statistically likely to be have been stored at the region for a relatively long time (e.g., the information may be "cold"). As an illustrative example, if the block 112 is associated with the first tag 142 and the blocks 106, 108, and 110 are associated with the second tag 144 or the third tag 146, then information stored at the block 112 is statistically likely to be "colder" than information stored at the blocks 106, 108, 110, and 112. If the block 114 is not in use (e.g., has not been allocated), the free list 137 may indicate that the block 114 is free (e.g., is in an erased state).

In accordance with the present disclosure, wear leveling processes at the memory 104 may be performed using the set of tags 140. During the wear leveling process, the tag-based wear leveling engine 134 may select a first block of the memory 104. The first block may be an allocated block storing data. For example, if the block 106 stores the information 126, then the block 106 is an allocated block (and is not indicated by the free list 137). In response to selecting the first block, the controller 130 may de-allocate the first block (e.g., by releasing the block 106 to the free list 137).

In response to de-allocating the first block, the controller 130 may select a second region of the memory 104. For example, the controller 130 may access the free list 137 to select (e.g., allocate) the second region. As an illustrative example, the second block may correspond to the block 114. In response to de-allocating the first block, the controller 130 may modify the free list 137 to indicate that the first block is free (e.g., that the block 106 is in an erased state) and the second block has been allocated (e.g., that the block 114 stores valid data, or that valid data is scheduled to be copied to the block 114).

The controller 130 may copy information from the first region to the second region during the wear leveling process. For example, if the block 106 stores the information 126, the controller 130 may copy the information 126 to the block 114 (e.g., after de-allocating the block 106 and after allocating the block 114).

The tag-based wear leveling engine 134 may be configured to select the first region by selecting the "coldest" allocated region of the memory 104 (e.g., based on the set of tags 140) and to select the second region by selecting the "hottest" region indicated by the free list 137. For example, the tag-based wear leveling engine 134 may operate in accordance with one or more examples described with reference to FIG. 2.

The example of FIG. 1 illustrates techniques for selecting regions of the memory 104 for wear leveling processes. For example, by selecting the first region based on one or more parameters indicated by a tag (e.g., based on the parameters 154 indicated by the first tag 142), the "coldest" allocated region of the memory 104 may be selected for a wear leveling process (e.g., instead of selecting a region with a lowest number of PECs, which may not accurately indicate health of the region).

Figure 2:
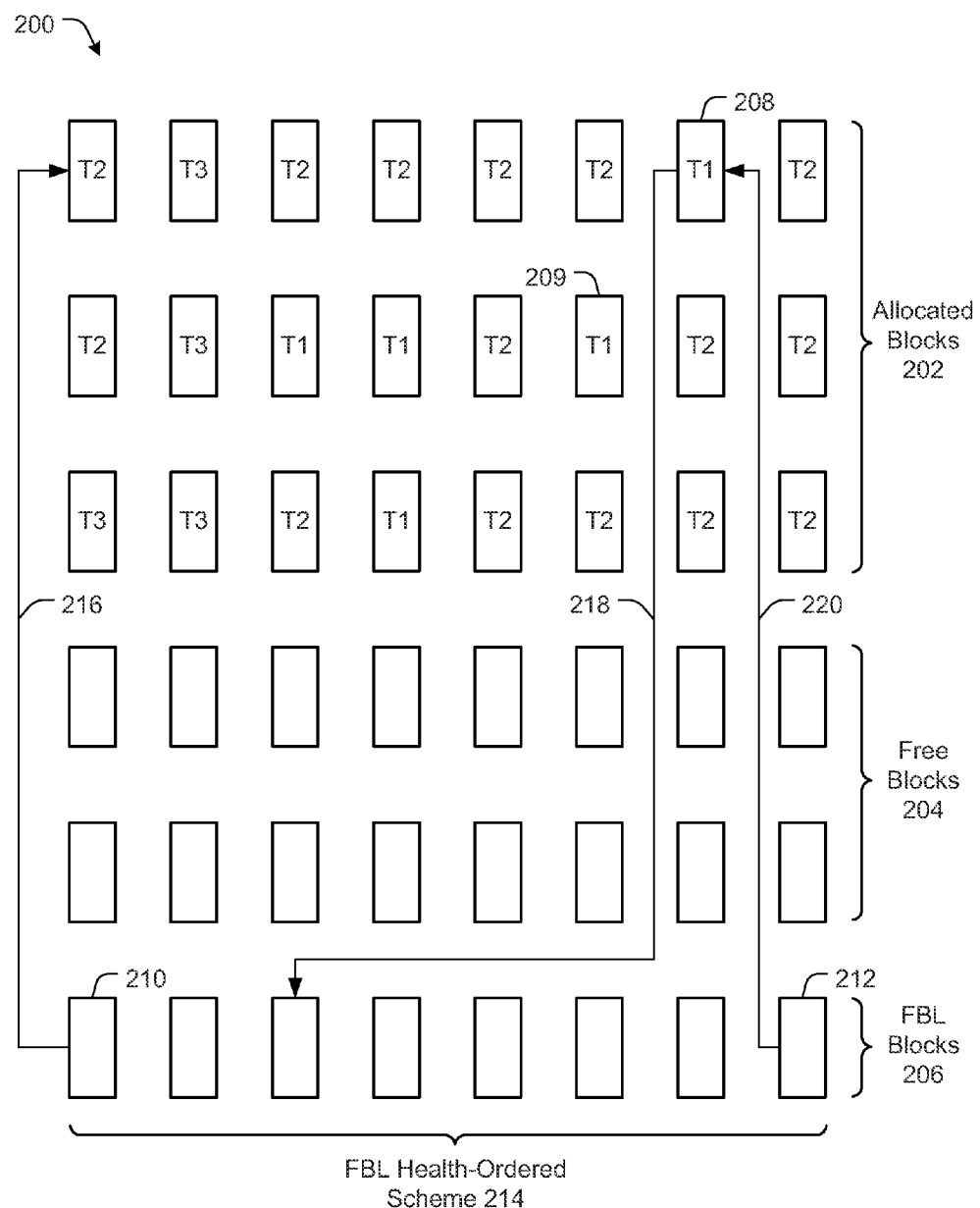
FIG. 2 is a diagram illustrating certain aspects of an example tag-based wear leveling process that may be performed by the data storage device of FIG. 1.

FIG. 2 illustrates certain aspects of an exemplary tag-based wear leveling process 200. In a particular embodiment, the data storage device 102 is configured to perform the tag-based wear leveling process 200 at the memory 104.

The example of FIG. 2 illustrates allocated blocks 202 (e.g., "intact" blocks of the memory 104 that store data), free blocks 204 (e.g., blocks of the memory 104 not storing data), and free block list (FBL) blocks 206 (e.g., blocks of the memory 104 indicated by the free list 137 as being available to be allocated). To illustrate, the allocated blocks 202 may include a block 208 and a block 209. As another example, the FBL blocks 206 may include a block 210 and a block 212.

Each of the allocated blocks 202 may be associated with a respective tag. For example, FIG. 2 illustrates that each of the allocated blocks 202 may be associated with Tag1 ("T1") (e.g., the first tag 142), Tag2 ("T2") (e.g., the second tag 144), or Tag3 ("T3") (e.g., the third tag 146).

In a particular embodiment, the free list 137 of FIG. 1 includes an ordered list of the FBL blocks 206. The free list may be ordered based on one or more parameters, such as a health metric h for each of the FBL blocks 206. For example, the FBL blocks 206 may be ordered from most healthy (e.g., the block having the numerically lowest health metric h) to least healthy (e.g., the block having the numerically highest health metric h). In the example of FIG. 2, the block 210 may be the healthiest block of the FBL blocks 206 and the block 212 may be the least healthy block of the FBL blocks 206. Accordingly, the FBL blocks 206 may be ordered (in the free list 137) according to a FBL health-ordered scheme 214.

In some implementations, the tag-based wear leveling process 200 may be initiated by the tag-based wear leveling engine 134 of FIG. 1 in response to the controller 130 erasing a region of the memory 104 (e.g., in response to erasing one of the blocks 106, 108, 110, 112, and 114). To illustrate, upon erasing a block of the memory 104, the tag-based wear leveling engine 134 may compare an average PEC count (or "hot count") of the allocated blocks 202 to an average PEC count of the FBL blocks 206. If the average PEC count of the FBL blocks 206 minus the average PEC count of the allocated blocks 202 satisfies a threshold PEC count, the tag-based wear leveling engine 134 may initiate the tag-based wear leveling process 200, such as by selecting a healthy block storing "cold" (or infrequently accessed) data for relocation to another block (e.g., so that the healthy block is accessed more frequently and so that one or more other less healthy blocks are used less frequently). In some implementations, the tag-based wear leveling engine 134 initiates the tag-based wear leveling process 200 in response to a determination that the data stored at the healthy block satisfies an access threshold (e.g., that the data is sufficiently "cold" to be relocated), as described further with reference to FIG. 7.

The tag-based wear leveling process 200 may include selecting a block of the FBL blocks 206 and allocating the block to the allocated blocks 202, at 216. For example, the tag-based wear leveling engine 134 may allocate the block 210, such as in response to a request from the host device 170 that causes the controller 130 to allocate a block of the FBL blocks 206 (e.g., when each of the allocated blocks 202 is full). After allocating the block 210, the block 210 is included in the allocated blocks 202. In a particular embodiment, the tag-based wear leveling engine 134 is configured to select the healthiest block of the FBL blocks 206 (i.e., the block 210 in the particular example of FIG. 2).

The tag-based wear leveling process 200 may further include assigning the block 210 to a tag in response to allocating the block 210 to the allocated blocks 202. For example, in response to programming information to the block 210 upon releasing the block 210 from the FBL blocks 206, the controller 130 may assign the block 210 to a tag (e.g., Tag1, Tag2, or Tag3) based on parameters associated with the block 210 (e.g., PECs, BER, and/or PEC conditions associated with the block 210). As an illustrative example, the block 210 may correspond to the block 106 of FIG. 1, and the block 210 may be associated with the parameters 158. In response to allocating the block 210, the controller 130 may determine (or re-determine) a health metric h associated with the block 210. Based on the health metric h, the controller 130 may assign the block 210 to the first tag 142 (or keep the block 210 assigned to the first tag 142), or the controller 130 may reassign the block 210 to another tag (e.g., to the second tag 144 or to the third tag 146).

The tag-based wear leveling process 200 may further include selecting a block of the allocated blocks 202 to be de-allocated (or "released" to the FBL blocks 206). In a particular illustrative embodiment, the tag-based wear leveling engine 134 is configured to select the block of the allocated blocks 202 storing the least frequently accessed (or "coldest") information based on the set of tags 140. To illustrate, certain example operations of the tag-based wear leveling engine 134 are described below.

To select the block to be de-allocated, the tag-based wear leveling engine 134 may compare tags of the allocated blocks 202 and may select the block having the numerically lowest tag having an assigned region (i.e., the numerically lowest "assigned tag"). As an example, if the block 208 is assigned to Tag1 and the other allocated blocks 202 are assigned to Tag2 or Tag3, then Tag1 is the numerically lowest assigned tag and the tag-based wear leveling engine 134 may select the block 208 to be de-allocated. As another example, if the block 208 is assigned to Tag2 and the other allocated blocks 202 are assigned to Tag3, then Tag2 is the numerically lowest assigned tag and the tag-based wear leveling engine 134 may select the block 208 to be de-allocated.

In some cases, multiple blocks may be assigned to the numerically lowest assigned tag. To illustrate, the example of FIG. 2 depicts that the allocated blocks 202 include multiple blocks assigned to Tag1 (e.g., the blocks 208, 209). In this case, the tag-based wear leveling engine 134 may select between the multiple blocks assigned to the numerically lowest assigned tag based on one or more criteria.

For example, FIG. 2 illustrates that the blocks 208, 209 may both be assigned to Tag1. In this example, the tag-based wear leveling engine 134 may be configured to compare health metrics associated with the blocks 208, 209. For example, if the blocks 208, 209 are both assigned to Tag1, the tag-based wear leveling engine 134 may be configured to compare a first health metric h associated with the block 208 to a second health metric h associated with the block 209 and to select the healthier block of the blocks 208, 209 (e.g., by selecting the block with the lower health metric h).

Alternatively or in addition, the tag-based wear leveling engine 134 may be configured to compare a first number of PECs of the block 208 to a second number of PECs of the block 209, such as in response to determining that the blocks 208, 209 are both assigned to a common tag and have health metrics within a similar range. The first number and the second number may be indicated by the parameters 154, 156, as an illustrative example. The tag-based wear leveling engine 134 may be configured to select the block 208 to be de-allocated in response to determining that the first number is less than the second number (because a lower number of PECs of the block 208 may indicate that the block 208 is healthier than the block 209).

In some cases, multiple blocks that are assigned to the numerically lowest assigned tag may have a same number (or similar number) of PECs. For example, if the first number and the second number are equal (or if a difference between the first number and the second number is within a threshold range, such as 50 PECs or less), the tag-based wear leveling engine 134 may use one or more other criteria to select a block of the allocated blocks 202 to be de-allocated.

For example, the tag-based wear leveling engine 134 may be configured to compare a first BER of the block 208 to a second BER of the block 209 in response to determining that the blocks 208, 209 are both assigned to a common tag (e.g., Tag1) and both have a common (or similar) number of PECs. The first BER and the second BER may be indicated by the parameters 154, 156, as an illustrative example. The tag-based wear leveling engine 134 may be configured to select the block 208 to be de-allocated in response to determining that the first BER is less than the second BER (because a lower BER of the block 208 may indicate that the block 208 is healthier than the block 209).

In some cases, multiple blocks that are assigned to the numerically lowest assigned tag may have a same number (or similar number) of PECs and may also have a same (or similar) BER. For example, if the first BER and the second BER are equal (or if a difference between the first BER and the second BER is within a threshold range, such as 50 bit errors or less), the tag-based wear leveling engine 134 may use one or more other criteria to select a block of the allocated blocks 202 to be de-allocated.

For example, the tag-based wear leveling engine 134 may be configured to compare a first PEC condition metric associated with the block 208 to a second PEC condition metric associated with the block 209 in response to determining that the blocks 208, 209 are both assigned to a common tag (e.g., Tag1), both have a common (or similar) number of PECs, and both have a common (or similar) BER. To illustrate, the first PEC condition metric may indicating a first programming voltage and/or a first number of programming pulses applied to storage elements of the block 208 to write information to the block 208, and the second PEC condition metric may indicate a second programming voltage and/or a second number of programming pulses applied to storage elements of the block 209 to write information to the block 209. The first PEC condition metric and the second PEC condition metric may be indicated by the parameters 154, 156, as an illustrative example. The tag-based wear leveling engine 134 may be configured to select the block 208 to be de-allocated in response to determining that the first PEC condition metric is less than the second PEC condition metric (because a lower programming voltage and/or fewer number of programming pulses applied to the block 208 may cause less "stress" to the block 208 and thus may indicate that the block 208 is healthier than the block 209).

After selecting the block 208, the tag-based wear leveling process 200 may further include de-allocating (or "releasing") the block 208 to the FBL blocks 206, at 218. For example, valid data at the block 208 may be copied to another location (e.g., to the latch 116 of FIG. 1, or another location), the block 208 may be erased, and the free list 137 of FIG. 1 may be updated to indicate the block 208 is free (e.g., is included in the FBL blocks 206). In this example, the controller 130 may update the free list 137, such as by adding a first indication of a first region (e.g., the block 208, which has been released to the FBL blocks 206 in this example).

In response to releasing the block 208 to the FBL blocks 206, the tag-based wear leveling process 200 may further include allocating a block of the FBL blocks 206, at 220. In a particular embodiment, the tag-based wear leveling engine 134 is configured to select a least healthy block of the FBL blocks 206 (e.g., by selecting a block based on the free list 137 indicating that the block is less healthy than other regions indicated by the free list 137) and to allocate the least healthy block. As used herein, a particular block may be less healthy than one or more other blocks if the particular block has a greater health metric h than the one or more other blocks, as an illustrative example. In the example of FIG. 2, the least healthy block of the FBL blocks 206 may correspond to the block 212. In this example, the controller 130 may update the free list 137, such as by deleting a second indication of a second region (e.g., the block 212, which has been allocated from the FBL blocks 206 to the allocated blocks 202 in this example).

After allocating the block 212, the tag-based wear leveling process 200 may further include relocating the valid data copied from the block 208 to the block 212. For example, if the valid data was copied from the block 208 to the latch 116 prior to de-allocating the block 208, the valid data may be relocated from the latch 116 to the block 212.

By selecting the blocks 208, 212 for a wear leveling process in accordance with the examples of FIG. 2, performance of a data storage device may be improved. For example, selecting the blocks 208, 212 using health information may improve performance as compared to selecting blocks based only on PECs.

Figure 3:
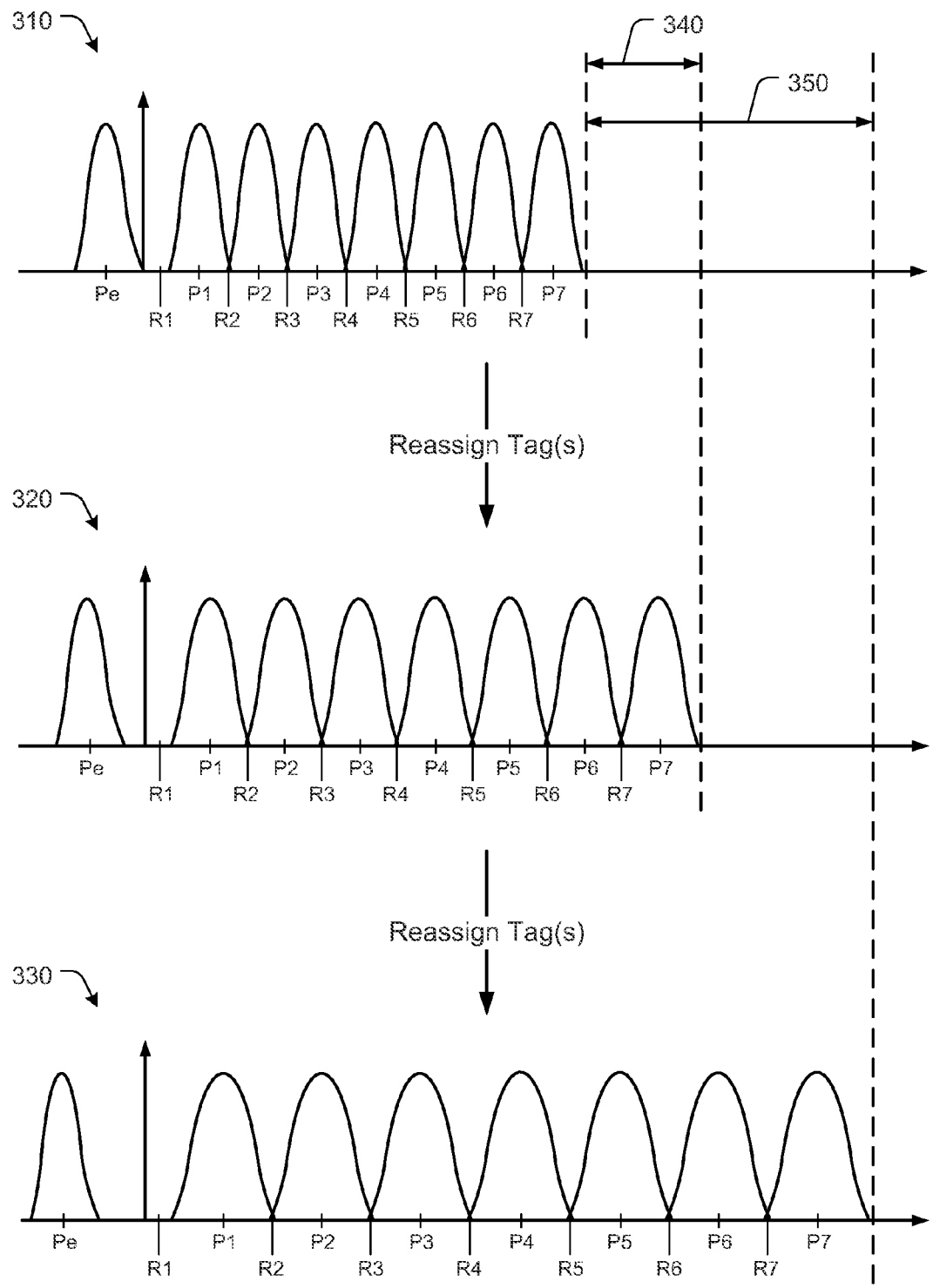
FIG. 3 is a diagram illustrating certain aspects of tag-based programming processes and read processes that may be performed by the data storage device of FIG. 1.

FIG. 3 illustrates example threshold voltage distributions of the memory 104 in accordance with a tag-based write process and a tag-based read process. For example, the tag based-write process and the tag-based read process may be initiated by the tag-based read/write engine 136 to program information (e.g., the information 126) to the memory 104 and to access the information from the memory 104 (e.g., by sensing the information 126 to generate the sensed information 128).

FIG. 3 depicts a first histogram 310 illustrating a first set of threshold voltage distributions, a second histogram 320 illustrating a second set of threshold voltage distributions, and a third histogram 330 illustrating a third set of threshold voltage distributions. In each of the histograms 310, 320, and 330, the abscissa indicates voltage (V), and the ordinate indicates numbers of storage elements (or logarithms of numbers of storage elements). Although the example of FIG. 3 depicts an illustrative three-bit-per-cell (X3) configuration (with eight different states), it should be appreciated that disclosure applies to other configurations, such as two-bit-per-cell (X2) configurations and one-bit-per-cell (X1) configurations, as illustrative examples.

In a particular embodiment, the tag-based read/write engine 136 is configured to initiate programming of information (e.g., the information 126) to the memory 104 using a first set of programming voltages of the first histogram 310 (Pe, P1, P2, P3, P4, P5, P6, and P7). The tag-based read/write engine 136 may be configured to apply a first set of read voltages (R1, R2, R3, R4, R5, R6, and R7) to sense information from the memory 104 (e.g., by sensing stored information to generate the sensed information 128). In a particular implementation, the first set of programming voltages and the first set of read voltages may be applied at the memory die 103 during a beginning-of-life (BoL) stage of operation of the memory die 103.

During operation of the data storage device 102, one or more regions of the memory 104 may be reassigned to one or more tags of the set of tags 140. Reassigning one or more regions may cause the data storage device 102 to transition from operation corresponding to the first histogram 310 to operation corresponding the second histogram 320. In a particular embodiment, the transition is initiated in response to a tag "floor" being reached (e.g., when a threshold number of regions of the memory 104 are associated with the second tag 144, which may cause the second tag 144 to function as a tag "floor" so that one or more regions of the memory 104 assigned to the first tag 142 are reassigned to the second tag 144). In a particular example, the transition corresponds to a transition from the BoL stage of operation to a middle-of-life (MoL) stage of operation of the data storage device 102.

The second histogram 320 illustrates that the first set of programming voltages and the first set of read voltages have been modified to produce a second set of programming voltages and a second set of read voltages. For example, each programming voltage of the first set of programming voltages may be adjusted based on a delta value 340 (e.g., 0.2 V, 0.5 V, or another value) to generate the second set of programming voltages. As another example, each read voltage of the first set of read voltages may be adjusted based on the delta value 340 (e.g., 0.2 V, 0.5 V, or another value) to generate the second set of read voltages. Alternatively or in addition, a number of programming pulses applied to storage elements of the memory 104 may be increased to further "separate" distributions of the second histogram 320 relative to distributions of the first histogram 310 (e.g., by increasing a number of programming pulses from 10 to 15, as an illustrative example).

In a particular embodiment, the tag-based read/write engine 136 is configured to initiate programming of information (e.g., the information 126) to the memory 104 using the second set of programming voltages and to apply the second set of read voltages to sense information from the memory 104 (e.g., by sensing information to generate the sensed information 128). In a particular implementation, the second set of programming voltages and the second set of read voltages may be applied at the memory die 103 during an MoL stage of operation of the memory die 103.

During operation of the data storage device 102, one or more regions of the memory 104 may be reassigned to one or more tags of the set of tags 140. Reassigning one or more regions may cause the data storage device 102 to transition from operation corresponding to the second histogram 320 to operation corresponding the third histogram 330. In a particular embodiment, the transition is initiated in response to a tag "floor" being reached (e.g., when a threshold number of regions of the memory 104 are associated with the third tag 146, which may cause the third tag 146 to function as a tag "floor" so that one or more regions of the memory 104 assigned to the second tag 144 are reassigned to the third tag 146). In a particular example, the transition corresponds to a transition from the MoL stage of operation to an end-of-life (EoL) stage of operation of the data storage device 102.

The third histogram 330 illustrates that the second set of programming voltages and the second set of read voltages have been modified to produce a third set of programming voltages and a third set of read voltages. For example, each programming voltage of the second set of programming voltages may be adjusted based on a delta value 350 (e.g., 0.2 V, 0.5 V, or another value) to generate the third set of programming voltages. As another example, each read voltage of the second set of read voltages may be adjusted based on the delta value 350 (e.g., 0.2 V, 0.5 V, or another value) to generate the third set of read voltages. Depending on the particular implementation, the delta value 340 may be equal to the delta value 350, the delta value 340 may be less than the delta value 350, or the delta value 340 may be greater than the delta value 350. Alternatively or in addition, a number of programming pulses applied to storage elements of the memory 104 may be increased to further "separate"

distributions of the third histogram 330 relative to the second histogram 320 (e.g., by increasing a number of programming pulses from 15 to 20, as an illustrative example).

In a particular embodiment, the tag-based read/write engine 136 is configured to initiate programming of information (e.g., the information 126) to the memory 104 using the third set of programming voltages and to apply the third set of read voltages to sense information from the memory 104 (e.g., by sensing stored information to generate the sensed information 128). In a particular implementation, the third set of programming voltages and the third set of read voltages may be applied at the memory die 103 during an EoL stage of operation of the memory die 103.

The example of FIG. 3 illustrates that tags (e.g., the set of tags 140) can be used in connection with read and write operations at the memory 104. By shifting programming voltages and/or read voltages based on the delta value 340 and/or based on the delta value 350, read margin associated with read operations at the memory 104 can be increased. Increased read margin may reduce errors at the data storage device 102 as the data storage device ages (e.g., as the data storage device progresses to the MoL stage and/or to the EoL stage).

Figure 4:
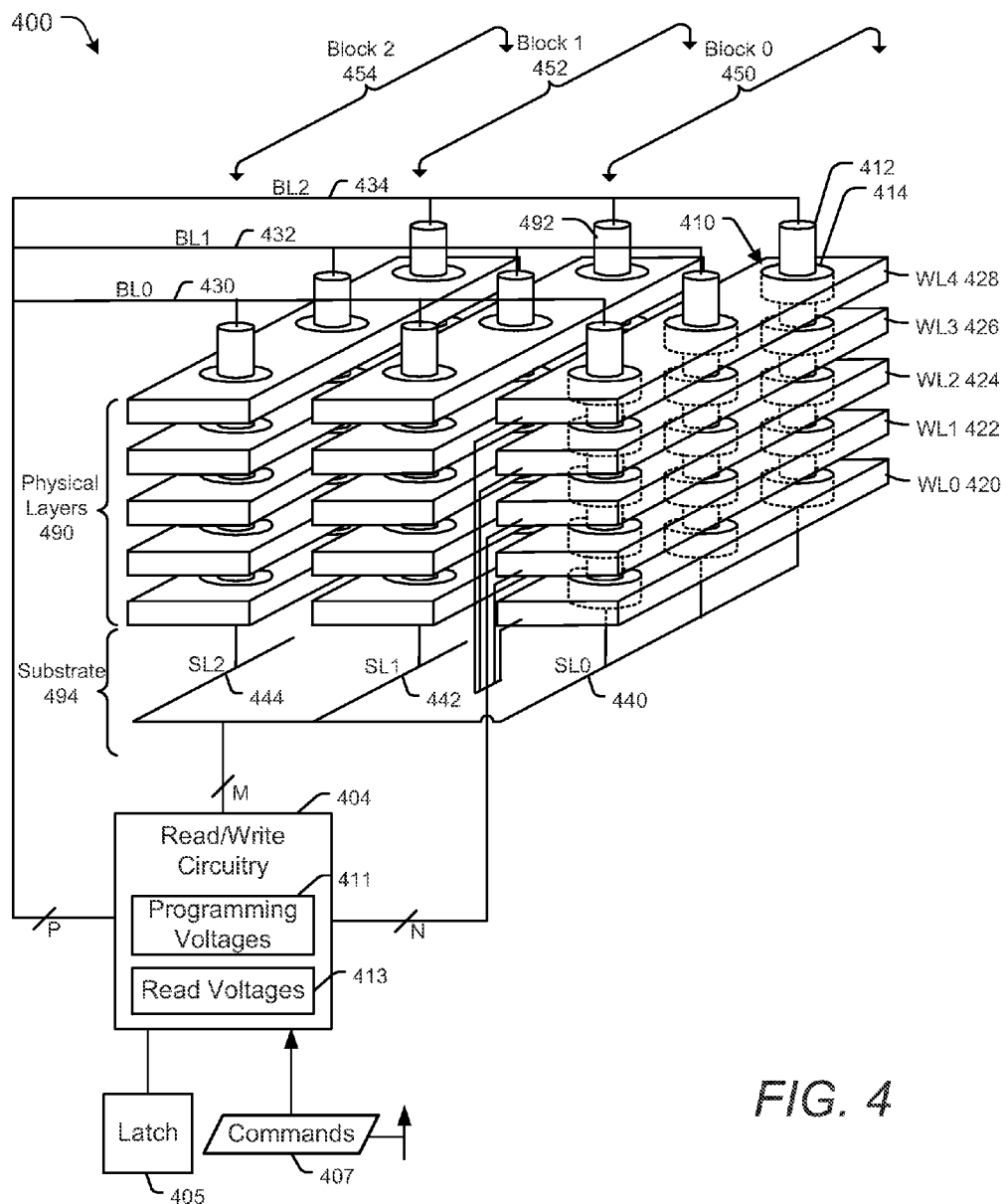
FIG. 4 is a diagram of an illustrative embodiment of a portion of a memory die that may be included in the data storage device of FIG. 1.

FIG. 4 illustrates a portion of a memory die 400 having a NAND flash configuration. The memory die 400 may be included in the data storage device 102 of FIG. 1. For example, the memory die 400 may correspond to the memory die 103 of FIG. 1. The memory die 400 may be coupled to the controller 130 of FIG. 1.

The memory die 400 may include read/write circuitry 404 and one or more latches (e.g., a latch 405). The read/write circuitry 404 may correspond to the read/write circuitry 118 of FIG. 1, and the latch 405 may correspond to the latch 116 of FIG. 1.

The memory die 400 includes multiple physical layers, such as a group of physical layers 490. The multiple physical layers are monolithically formed above a substrate 494, such as a silicon substrate. Storage elements (e.g., memory cells), such as a representative memory cell 410, are arranged in arrays in the physical layers.

The representative memory cell 410 includes a charge trap structure 414 between a word line/control gate (WL4) 428 and a conductive channel 412. Charge may be injected into or drained from the charge trap structure 414 via biasing of the conductive channel 412 relative to the word line 428. For example, the charge trap structure 414 may include silicon nitride and may be separated from the word line 428 and the conductive channel 412 by a gate dielectric, such as silicon oxide. An amount of charge in the charge trap structure 414 affects an amount of current through the conductive channel 412 during a read operation of the memory cell 410 and indicates one or more bit values that are stored in the memory cell 410.

The memory die 400 includes multiple erase blocks, including a first block (block 0) 450, a second block (block 1) 452, and a third block (block 2) 454. Each block 450-454 includes a "vertical slice" of the physical layers 490 that includes a stack of word lines, illustrated as a first word line (WL0) 420, a second word line (WL1) 422, a third word line (WL2) 424, a fourth word line (WL3) 426, and a fifth word line (WL4) 428. Multiple conductive channels (having a substantially vertical orientation with respect to FIG. 4) extend through the stack of word lines. Each conductive channel is coupled to a storage element in each word line 420-428, forming a NAND string of storage elements. FIG. 4 illustrates three blocks 450-454, five word lines 420-428 in each block, and three conductive channels in each block for clarity of illustration. However, the memory die 400 may have more than three blocks, more than five word lines per block, and more than three conductive channels per block.

The read/write circuitry 404 is coupled to the conductive channels via multiple conductive lines, illustrated as a first bit line (BL0) 430, a second bit line (BL1) 432, and a third bit line (BL2) 434 at a "top" end of the conducive channels (e.g., farther from the substrate 494). The read/write circuitry 404 is also coupled to the conductive channels via multiple source lines, such as via a first source line (SL0) 440, a second source line (SL1) 442, and a third source line (SL2) 444 at a "bottom" end of the conductive channels (e.g., nearer to or within the substrate 494). The read/write circuitry 404 is illustrated as coupled to the bit lines 430-434 via "P" control lines, coupled to the source lines 440-444 via "M" control lines, and coupled to the word lines 420-428 via "N" control lines. Each of P, M, and N may have a positive integer value based on the specific configuration of the memory die 400. In the illustrative example of FIGS. 4, P=3, M=3, and N=5.

In a particular embodiment, each of the bit lines and each of the source lines may be coupled to the same end (e.g., the top end or the bottom end) of different conductive channels. For example, a particular bit line may be coupled to the top of a conductive channel 492 and a particular source line may be coupled to the top of the conductive channel 412. The bottom of the conductive channel 492 may be coupled (e.g., electrically coupled) to the bottom of the conductive channel 412. Accordingly, the conductive channel 492 and the conductive channel 412 may be coupled in series and may be coupled to the particular bit line and the particular source line.

In operation, the memory die 400 may perform write operations and read operations, such as in response to receiving commands 407 from the controller 130 of FIG. 1. The commands 407 may include one or more write commands that specify a particular set of programming voltages of programming voltages 411 for a write operation at the memory die 400. For example, the particular set of programming voltages may correspond to the first set of programming voltages of FIG. 3, the second set of programming voltages of FIG. 3, or the third set of programming voltages of FIG. 3. Alternatively or in addition, the commands 407 may include one or more read commands that specify a particular set of read voltages of read voltages 413 for a read operation at the memory die 400. For example, the particular set of read voltages may correspond to the first set of read voltages of FIG. 3, the second set of read voltages of FIG. 3, or the third set of read voltages of FIG. 3. To further illustrate, certain example aspects of read and write operations are described below.

During a write operation, the controller 130 of FIG. 1 may receive a request from the host device 170 of FIG. 1. The request may include data (e.g., the data 160) to be written at storage elements of the memory die 400. The controller 130 may send a command to the memory die 400 to cause the memory die 400 to initiate the write operation. For example, the controller 130 may send a write opcode and a physical address to the read/write circuitry 404 and data to the latch 405.

The read/write circuitry 404 may be configured to access the data in the latch 405 and to program the data to storage elements of the memory die 400 based on one or more write parameters indicated by the particular command. For example, the read/write circuitry 404 may be configured to apply selection signals to control lines coupled to the word lines 420-428, the bit lines 430-434, and the source lines 440-442 to cause a programming voltage (e.g., a voltage pulse or series of voltage pulses) to be applied across one or more selected storage elements of the selected word line (e.g., the fourth word line 428, as an illustrative example).

During a read operation, the controller 130 of FIG. 1 may receive a request from a host device, such as the host device 170 of FIG. 1. The controller 130 may cause the read/write circuitry 404 to read bits from particular storage elements of the memory die 400 by applying appropriate signals to the control lines to cause storage elements of a selected word line to be sensed. Accordingly, the memory die 400 may be configured to store and access data, such as by storing the information 126 and by sensing the information 126 to generate the sensed information 128 of FIG. 1.

Figure 5:
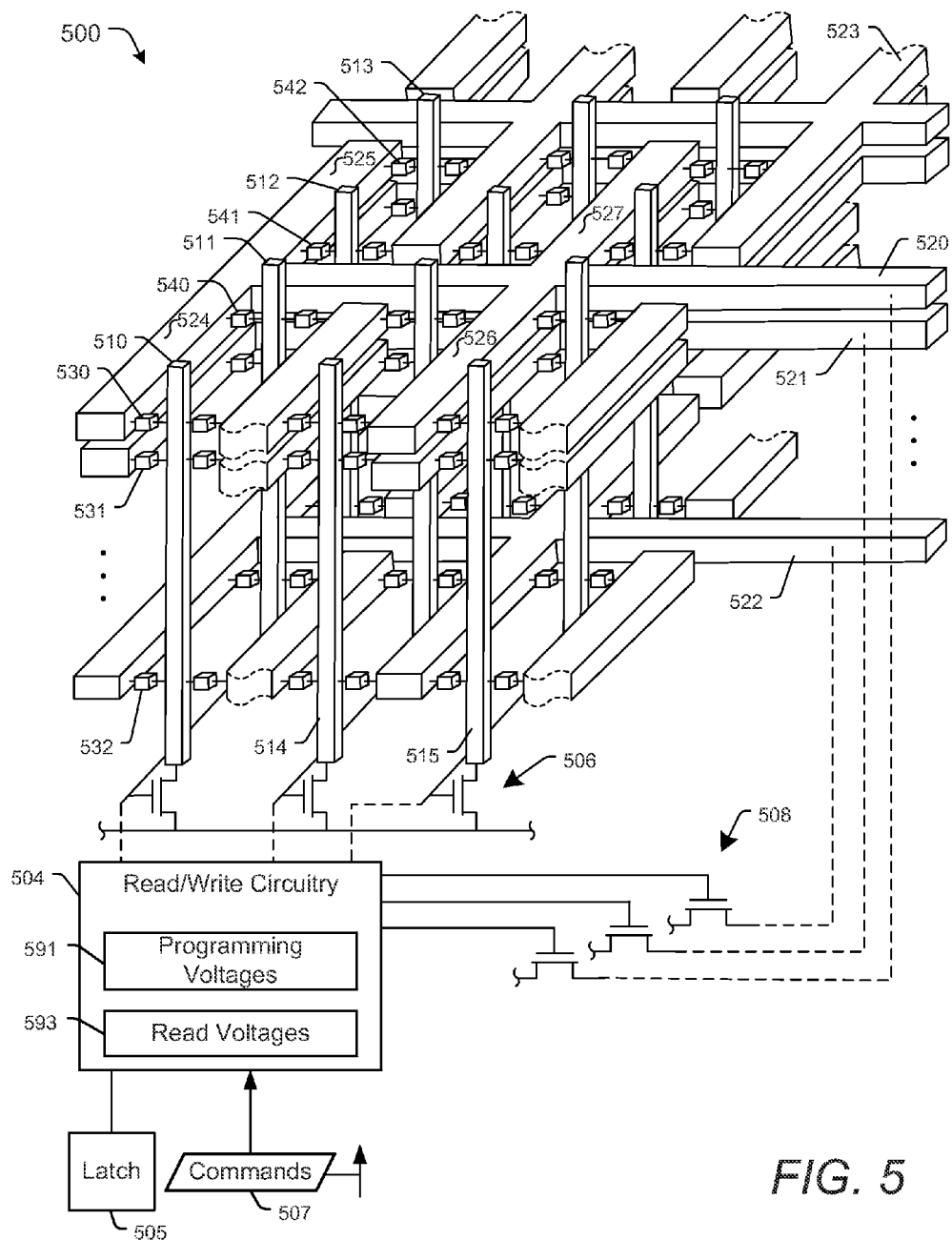
FIG. 5 is a diagram of another illustrative embodiment of a portion of a memory die that may be included in the data storage device of FIG. 1.

FIG. 5 illustrates a portion of a memory die 500 having a ReRAM configuration. The memory die 500 may be included in the data storage device 102 of FIG. 1. For example, the memory die 500 may correspond to the memory die 103 of FIG. 1. The memory die 500 may be coupled to the controller 130 of FIG. 1.

The memory die 500 may include read/write circuitry 504 and one or more latches (e.g., a latch 505). The read/write circuitry 504 may correspond to the read/write circuitry 118 of FIG. 1, and the latch 505 may correspond to the latch 116 of FIG. 1.

In the example of FIG. 5, the memory die 500 includes a vertical bit line (VBL) ReRAM with a plurality of conductive lines in physical layers over a substrate (e.g., substantially parallel to a surface of the substrate), such as representative word lines 520, 521, 522, and 523 (only a portion of which is shown in FIG. 5). The VBL ReRAM also includes a plurality of vertical conductive lines through the physical layers, such as representative bit lines 510, 511, 512, and 513. The word line 522 may include or correspond to a first group of physical layers, and the word lines 520, 521 may include or correspond to a second group of physical layers.

The memory die 500 also includes a plurality of resistance-based storage elements (e.g., memory cells), such as representative storage elements 530, 531, 532, 540, 541, and 542. Each of the storage elements 530, 531, 532, 540, 541, and 542 is coupled to (or is associated with) a bit line and a word line in arrays of memory cells in multiple physical layers over the substrate (e.g., a silicon substrate).

In the example of FIG. 5, each word line includes a plurality of fingers. To illustrate, the word line 520 includes fingers 524, 525, 526, and 527. Each finger may be coupled to more than one bit line. For example, the finger 524 of the word line 520 is coupled to the bit line 510 via the storage element 530 at a first end of the finger 524, and the finger 524 is further coupled to the bit line 511 via the storage element 540 at a second end of the finger 524.

In the example of FIG. 5, each bit line may be coupled to more than one word line. To illustrate, the bit line 510 is coupled to the word line 520 via the storage element 530, and the bit line 510 is further coupled to the word line 522 via the storage element 532.

In operation, the memory die 500 may perform write operations and read operations, such as in response to receiving commands 507 from the controller 130 of FIG. 1. The commands 507 may include one or more write commands that specify a particular set of programming voltages of programming voltages 591 for a write operation at the memory die 500. For example, the particular set of programming voltages may correspond to the first set of programming voltages of FIG. 3, the second set of programming voltages of FIG. 3, or the third set of programming voltages of FIG. 3. Alternatively or in addition, the commands 507 may include one or more read commands that specify a particular set of read voltages of read voltages 593 for a read operation at the memory die 500. For example, the particular set of read voltages may correspond to the first set of read voltages of FIG. 3, the second set of read voltages of FIG. 3, or the third set of read voltages of FIG. 3. To further illustrate, certain example aspects of read and write operations are described below.

During a write operation, the controller 130 of FIG. 1 may receive data (e.g., the data 160 of FIG. 1) from a host device, such as the host device 170 of FIG. 1. The controller 130 may send a command to the memory die 500 to cause the memory die 500 to initiate the write operation. The controller 130 may send data (e.g., the information 126) to the memory die 500 to be written to storage elements of the memory die 500. For example, the controller 130 may latch the data into the latch 505.

The read/write circuitry 504 may be configured to access the data in the latch 505 and to program the data to storage elements corresponding to the destination of the data. For example, the read/write circuitry 504 may apply selection signals to selection control lines coupled to the word line drivers 508 and the bit line drivers 506 to cause a write voltage to be applied across a selected storage element. As an illustrative example, to select the storage element 530, the read/write circuitry 504 may activate the word line drivers 508 and the bit line drivers 506 to drive a programming current (also referred to as a write current) through the storage element 530. To illustrate, a first write current may be used to write a first logical value (e.g., a value corresponding to a high-resistance state) to the storage element 530, and a second write current may be used to write a second logical value (e.g., a value corresponding to a low-resistance state) to the storage element 530. The programming current may be applied by generating a programming voltage across the storage element 530 by applying a first voltage to the bit line 510 and to word lines other than the word line 520 and by applying a second voltage to the word line 520. In a particular embodiment, the first voltage is applied to other bit lines (e.g., the bit lines 514, 515) to reduce leakage current in the memory die 500.

During a read operation, the controller 130 may receive a request from a host device, such as the host device 170 of FIG. 1. The controller 130 may issue a command to the memory die 500 specifying one or more physical addresses of the memory die 500.

The memory die 500 may cause the read/write circuitry 504 to read bits from particular storage elements of the memory die 500, such as by applying selection signals to selection control lines coupled to the word line drivers 508 and the bit line drivers 506 to cause a read voltage to be applied across a selected storage element. For example, to select the storage element 530, the read/write circuitry 504 may activate the word line drivers 508 and the bit line drivers 506 to apply a first voltage (e.g., 0.7 volts (V)) to the bit line 510 and to word lines other than the word line 520. A lower voltage (e.g., 0 V) may be applied to the word line 520. Thus, a read voltage is applied across the storage element 530, and a read current corresponding to the read voltage may be detected at a sense amplifier of the read/write circuitry 504. The read current corresponds (via Ohm's law) to a resistance state of the storage element 530, which corresponds to a logic value stored at the storage element 530. The logic value read from the storage element 530 and other elements read during the read operation may be provided to the controller 130 of FIG. 1 (e.g., via the latch 505).

Figure 6:
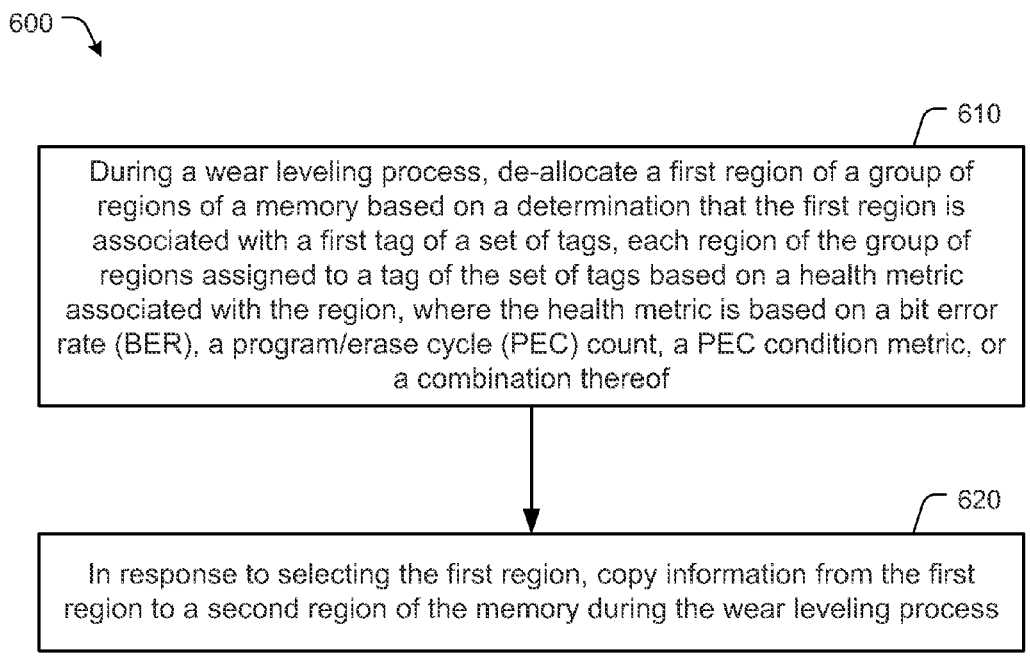
FIG. 6 is a flow diagram of an illustrative embodiment of a method of operation of the data storage device of FIG. 1.

Referring to FIG. 6, an illustrative example of a method is depicted and generally designated 600. The method 600 may be performed in a data storage device (e.g., the data storage device 102) that includes a memory (e.g., the memory 104). In a particular embodiment, operations of the method 600 are performed by the controller 130.

The method 600 includes de-allocating a first region of a group of regions of the memory based on a determination that the first region is associated with a first tag of a set of tags during a wear leveling process, at 610. The group of regions may include blocks, such as any of the blocks 106, 108, 110, 112, 114, 202, 450, 452, and 454. As an illustrative example, the first region may correspond to the block 106, and the group of regions may include the blocks 106, 108, 110, 112, and 114. As another example, the first region may correspond to the block 208, and the group of regions may include the allocated blocks 202. As another example, the first region may correspond to the block 450, and the group of regions may include the blocks 450, 452, and 454. In a NAND flash configuration, a "block" may refer to an erase group of storage elements. In a ReRAM configuration, the first region (or a "block") may be a group of storage elements, such as one or more word lines of storage elements (e.g., the word lines 520, 521, 522, and 523), one or more bit lines of storage elements (e.g., the bit lines 510, 511, 512, and 513), and/or one or more fingers of storage elements (e.g., the fingers 524, 525, 526, and 527), as illustrative examples.

To further illustrate, the first tag may correspond to the first tag 142, and the set of tags may correspond to the set of tags 140. Each region of the group of regions is assigned to a tag of the set of tags based on a health metric associated with the region. For example, the health metrics may include a health metric h for each region of the group of regions. To further illustrate, a health metric of a region may be determined based on a bit error rate (BER) of the region, a program/erase cycle (PEC) count of the region, a PEC condition metric of the region, or a combination thereof.

The method 600 may further include copying information from the first region to a second region of the memory during the wear leveling process in response to selecting the first region, at 620. As an illustrative example, the second region may correspond to the block 108, and the information 126 may be copied from the block 106 to the block 108 during the wear leveling process. In other examples, the second region may correspond to another region described herein, such as any of the blocks 106, 108, 110, 112, 114, 202, 450, 452, and 454, one or more word lines of storage elements (e.g., the word lines 520, 521, 522, and 523), one or more bit lines of storage elements (e.g., the bit lines 510, 511, 512, and 513), and/or one or more fingers of storage elements (e.g., the fingers 524, 525, 526, and 527).

Because the wear leveling process of FIG. 6 is performed using a set of tags associated with health metrics, performance of the data storage device may be improved. For example, performance of the data storage device may be improved as compared to a device that performs wear leveling based only on numbers PECs associated with regions of a memory.

In connection with the present disclosure, certain examples are provided below (e.g., in connection with FIG. 7) for illustration. It should be appreciated that such examples are illustrative and that the particular implementation may depend on the particular application.

In at least one implementation, physical wear of all data blocks of the memory 104 (or the memory die 103) is balanced by storing frequently accessed and/or recently accessed (or "hot") data in less worn blocks and by storing infrequently and/or non-recently accessed (or "cold") data in more worn blocks. In some existing devices, a PEC count of a block is used to determine whether data at the block is hot or cold. Such a technique may be unreliable and may cause data retention failures (e.g., when the block has lower than expected quality) and less endurance gains (e.g., when the block has higher than expected quality).

The data storage device 102 may support a number of tags (e.g., 32 tags, 64 tags, 256 tags, or another number of tags). In a particular embodiment, only one tag is active for an entire die (e.g., the memory die 103) at a time, and each block of the die is assigned to the active tag when each such block is allocated. A die usage indicator may be used to indicate performance or health of a region. Examples of a die usage indicator include a block health meter (BHM), an average BHM, a PEC count, and/or an average PEC count.

When a die usage indicator satisfies a threshold at the data storage device 102, a new tag may be generated for the whole die. All the new blocks allocated on the die may be assigned this new tag. To illustrate, if the current active tag for the die has a numeric value of two (e.g., the second tag 144 in FIG. 1 and/or Tag2 in FIG. 2) and the die usage indicator does not satisfy the threshold, then all the new blocks allocated will be assigned to tag two. When the die usage indicator satisfies the threshold, another tag may become active for the die. For example, if the other tag has a numeric value of three (e.g., the third tag 146 in FIG. 1 and/or Tag3 in FIG. 2), then all the new blocks allocated after activation of tag three after activation of tag three (until tag four is activated, etc.).

To select a block for static wear leveling at the data storage device 102, instead of using PEC/BHM as the sole criteria for selecting the block, a multi-step process may be implemented (e.g., by the tag-based wear leveling engine 134 of FIG. 1). For example, a multi-step process may include selecting blocks from the oldest tag first and then selecting among blocks with the same tag based on PEC/BHM. By using a multi-step process, blocks with the coldest data may be selected for relocation of data to the least healthy block or the block with the highest PEC in the free block list (FBL) (e.g., the free list 137 of FIG. 1). The multi-step process may reduce or eliminate data retention failures and may also increase endurance gain at the memory 104 (e.g., due to reduced likelihood of cold data being copied to an unhealthy block and/or to a frequently changing block).

A wear leveling process in accordance with the disclosure (e.g., a multi-step wear leveling process) possesses several advantages over traditional wear leveling. For example, old data may be securely relocated to prevent the old data from becoming corrupted. Such a wear leveling process may also enable more systematic labeling of the block quality/age and may use a greater number of parameters to assess the block quality/age. In addition, such a wear leveling process may increase flexibility of definition of block quality/age, may be efficient (e.g., inexpensive) to implement, and may significantly increase average block lifetime. In a NAND flash implementation, threshold voltage distributions of data may be better than "normal" (e.g., average or expected). In some implementations, wear leveling operations are performed as "background" processes by the tag-based wear leveling engine 134 (e.g., when commands are not being received from the host device 170).

In accordance with the disclosure, a tag described herein (e.g., any tag of the set of tags 140) may be defined according to the physical properties of a block and/or according to operations performed at a block. To illustrate, in a first example, a tag may indicate an average PEC count for a die (e.g., the memory die 103). In a second example, a tag may indicate a factor combination of factors such as BER, PEC, time, operating conditions, read condition delta, and/or physical location within the die. An example of a factor combination is the health metric h described above with reference to FIG. 1. In a third example, such factors may be multiplied (e.g., by multiplying BER, PEC, time, operating condition information, read condition delta, and/or physical location information). In a fourth example, a multi-stepped sorting process of such factors may enable "effective" tagging of the block. For example, the multi-stepped sorting process may include (a) sorting a block based on BER, (b) sorting the results of (a) based on PEC, and (c) sorting the results of (b) based on operating conditions, etc.

In a particular example, each time a block is allocated from the FBL (e.g., the free list 137), the block is assigned a tag number. When the number of blocks assigned with a particular tag reaches a predefined threshold, the next tag may become the current tag and may be assigned to the blocks allocated after that (until the number of block allocated again reaches the threshold). The tag number may be incremented by one every time the number of blocks assigned with a particular tag reaches the threshold. A system can have up to 8, 16, 32 or 64 tags, as illustrative examples. The data storage device 102 may be configured to track the number of blocks assigned to each tag.

In an illustrative example, if an oldest allocated block is assigned to a tag with a numeric value that is greater than the numeric value of the current tag minus three, a static wear leveling process is performed. The static wear leveling process may include selecting the source block with the lowest PEC and the oldest tag from an allocated block list, moving the static (cold) data from the block to a new (higher PEC) block, and erasing the block to allow future using of this block. If the oldest allocated block is assigned to a tag having a numeric value that is equal to the numeric value of the current tag minus two, the static wear leveling process may include selecting the source block with the lowest PEC from the allocated block list, moving the static (cold) data from the block to a new (higher PEC) block, and erasing the block to enable future use of this block. (In this example, the tag assigned to the block may be ignored because the data in the block is not considered old enough to have data retention issues.)

Each time a block is erased, a wear leveling process may include recalculating allocated blocks average "hot count" (HC) (e.g., the average PEC count of the allocated blocks) and FBL average HC. If the FBL average HC is greater than the allocated blocks average HC by some threshold value, wear leveling may be initiated triggered. A threshold may be defined indicating how cold an allocated block should be for the exchange with free block to take place.

Figure 7:
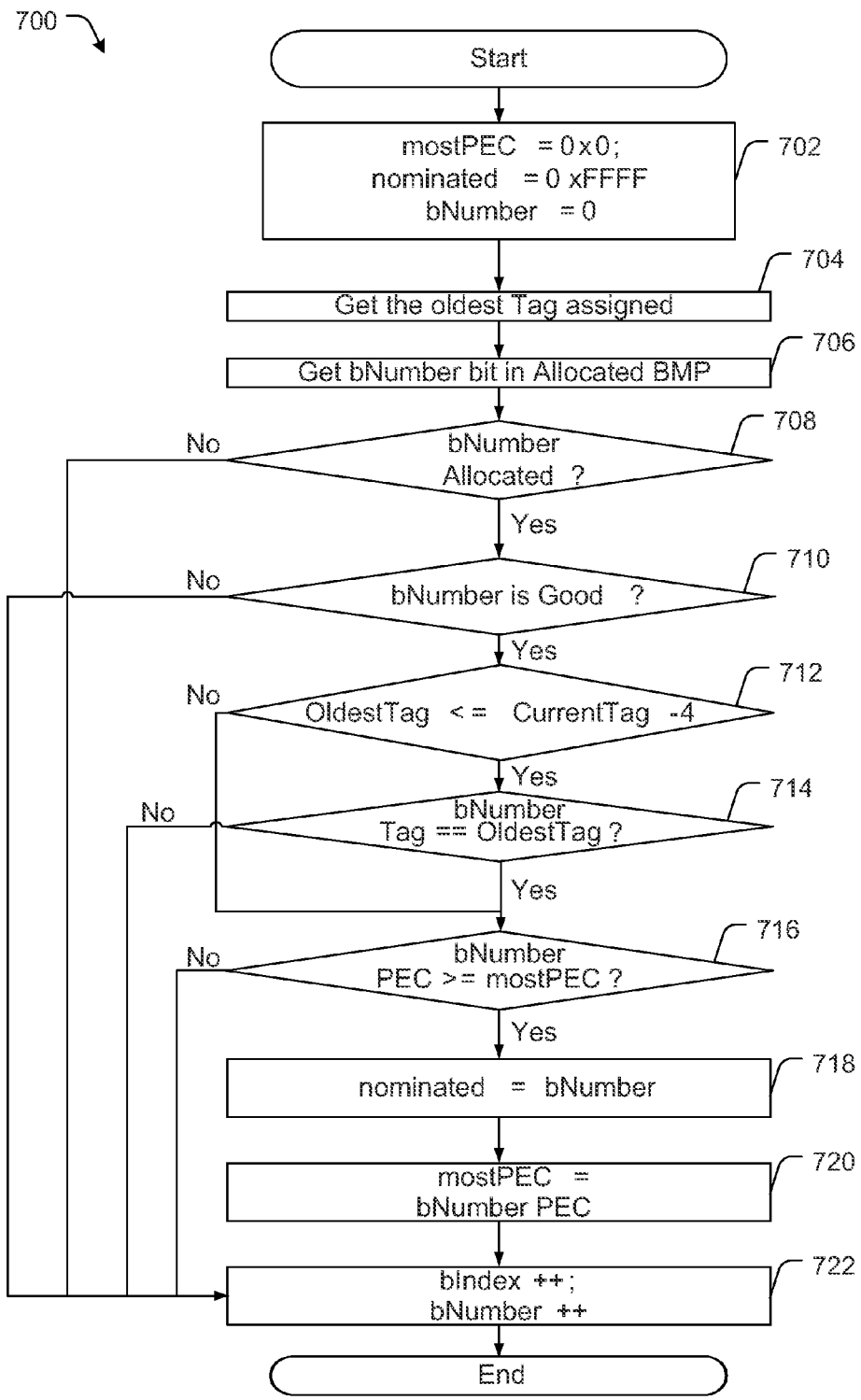
FIG. 7 is a flow diagram of another illustrative embodiment of a method of operation of the data storage device of FIG. 1.

FIG. 7 illustrates a particular illustrative embodiment of a method 700 for implementing certain example aspects of the disclosure. In some implementations, the method 700 may be performed at the data storage device 102 of FIG. 1. As an illustrative example, operations of the method 700 may be controlled, initiated, and/or performed by the tag-based wear leveling engine 134 of FIG. 1.

The method 700 may include selecting a block (a "nominated" block) of the memory 104, at 702. In the example of FIG. 7, the block may be selected based on a block identifier ("0xFFFF") associated with the block (e.g., by selecting a numerically highest or numerically lowest block identifier of a set of block identifiers stored at the controller 130 of FIG. 1). As an illustrative example, the block may correspond to the block 106, and the method 700 may be performed to determine whether to perform a wear leveling process using the block 106.

The method 700 may further include identifying an oldest assigned tag ("oldest tag") of the set of tags 140, at 704. For example, the oldest assigned tag may be the numerically lowest tag to which one or more blocks are assigned.

The method 700 may further include determining an indication ("bNumber") that corresponds to the block, at 706. In a particular illustrative embodiment, the data storage device 102 stores a bitmap ("allocated BMP") for allocated blocks of the memory 104, and each bit of the bitmap may indicate whether a corresponding block of the memory 104 is allocated. For example, bNumber=0 for the block may indicate that the block is not allocated (e.g., the block is included in the FBL blocks 206 of FIG. 2), and bNumber=1 for the block may indicate that the block is allocated (e.g., the block is included in the allocated blocks 202).

In this example, the method 700 may include determining, based on the value of bNumber for the block, whether the block is allocated, at 708. If the block is allocated, the method 700 may optionally include determining whether bNumber is valid (e.g., "good"), at 710.

The method 700 may further include determining whether the numeric value of the oldest assigned tag ("bNumber Tag") satisfies an access threshold. For example, if the oldest assigned tag is relatively "new" (e.g., has been in use a relatively short time), then data stored at the block may not be sufficiently "cold" to be relocated, and wear leveling may be omitted. To further illustrate, FIG. 7 depicts that the method 700 may further include determining whether the numeric value of the oldest assigned tag is less than or equal to the numeric value of the tag to which newly opened blocks are assigned ("current tag") minus four, at 712. For example, if the oldest assigned tag corresponds to the first tag 142 (which may have a numeric value of one) and the current tag corresponds to either the second tag 144 (which may have a numeric value of two) or the third tag 146 (which may have a numeric value of three), then the numeric value of the oldest assigned tag is less than or equal to the numeric value of the current tag minus four. In these examples, wear leveling may be omitted (e.g., because an access threshold is not satisfied).

The method 700 may further include determining whether the numeric value of the oldest tag is equal to the numeric value of the current tag, at 714, and may further include determining whether a PEC count of the block ("bNumber PEC") satisfies a threshold number of PECs, such as a "maximum" number of PECs ("mostPEC") that are to be performed at each block of the memory 104 in certain implementations, at 716.

If the PEC count of the block satisfies the threshold number of PECs, the method 700 may further include adjusting the value of bNumber, at 718, and adjusting the value of mostPEC (e.g., by setting the value of mostPEC equal to the value of bNumber PEC), at 720. The method 700 may further include incrementing the value of bNumber and incrementing an index value (bIndex), at 722.

The method 700 illustrates that a bitmap may be used in connection with a tag-based wear leveling operation at the data storage device 102. For example, a value of each bit (bNumber) of the bitmap (allocated BMP) may indicate whether a corresponding block of the memory 104 has been allocated (e.g., included in the allocated blocks 202) or is free (e.g., included in the FBL blocks 206). Further, the method 700 includes tag-based operations (e.g., at 704, at 712, and at 714). Tag-based operations may improve performance of a device as compared to other wear level processes, since for example a tag may be associated with a health metric (e.g., the health metric h) that indicates (or approximates) physical characteristics of a block (e.g., an amount of physical wear of the block) more accurately as compared to use of only a PEC count to indicate physical wear of a block.

Although the tag-based wear leveling engine 134 and the tag-based read/write engine 136 and certain other components described herein are illustrated as block components and described in general terms, such components may include one or more microprocessors, state machines, and/or other circuits configured to enable the data storage device 102 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 102 to perform one or more operations described herein.

Alternatively or in addition, one or more aspects of the data storage device 102 may be implemented using a microprocessor or microcontroller programmed (e.g., by executing instructions) to perform operations described herein, such as one or more operations of the tag-based wear leveling process 200 of FIG. 2, one or more operations of the method 600 of FIG. 6, one or more operations of the method 700 of FIG. 7, or a combination thereof. In a particular embodiment, the data storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

It should be appreciated that one or more operations described herein as being performed by the controller 130 may be performed at the memory 104. As an illustrative example, "in-memory" ECC operations may be performed at the memory die 103 alternatively or in addition to performing such operations at the controller 130.

The data storage device 102 may be attached to or embedded within one or more host devices, such as within a housing of a host communication device (e.g., the host device 170). For example, the data storage device 102 may be integrated within an apparatus such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory. However, in other embodiments, the data storage device 102 may be implemented in a portable device configured to be selectively coupled to one or more external devices, such as the host device 170.

To further illustrate, the data storage device 102 may be configured to be coupled to the host device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively or in addition, the memory 104 may include another type of memory. In a particular embodiment, the data storage device 102 is indirectly coupled to an accessing device (e.g., the host device 170) via a network. For example, the data storage device 102 may be a network-attached storage (NAS) device or a component (e.g., a solid-state drive (SSD) component) of a data center storage system, an enterprise storage system, or a storage area network. The memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device comprising:
   a memory including a group of regions that includes a first region and a second region; and
   a controller coupled to the memory, the controller configured to perform a comparison of a first bit error rate (BER) associated with the first region and a second BER associated with the second region and to de-allocate the first region during a wear leveling process, the first region de-allocated based on a determination that the first region is associated with a first tag of a set of tags and further based on the comparison, and to set a programming voltage for a write operation associated with the first region based on the first region being associated with the first tag.

2. The device of claim 1, wherein the first tag statistically indicates an approximate duration that information has been stored at the first region, and wherein the controller is further configured to allocate a third region of the memory to allocated blocks of the memory based on a determination that a free block list indicates that the third region is frequently accessed.

3. The device of claim 1, wherein the first tag is a numerically lowest tag of the set of tags.

4. The device of claim 1, wherein the controller is further configured to copy information from the first region to a destination region of the memory during the wear leveling process.

5. The device of claim 1, wherein the first region and at least the second region are both associated with the first tag, and wherein the controller is further configured to compare a first number of program/erase cycles (PECs) of the first region to a second number of PECs of the second region in response to determining that the first region and the second region are associated with the first tag.

6. The device of claim 5, wherein the controller is further configured to perform the comparison of the first BER and the second BER in response to determining that the first number corresponds to the second number.

7. The device of claim 1, wherein the controller is further configured to assign the first region to the first tag based on a health metric associated with the first region, wherein the health metric is based on the first BER, a program/erase cycle (PEC) count, a PEC condition metric, or a combination thereof, and wherein the controller is further configured to initiate the wear leveling process.

8. The device of claim 1, wherein the memory has a three-dimensional (3D) memory configuration that is monolithically formed in one or more physical levels of arrays of memory cells having an active area above a silicon substrate.

9. The device of claim 1, wherein the controller is further configured to compare the first BER and the second BER in response to determining that a first number of program/erase cycles (PECs) of the first region corresponds to a second number of PECs of the second region.

10. The device of claim 1, wherein the controller is further configured to compare the first BER and the second BER in response to determining that a first number of program/erase cycles (PECs) of the first region is within a threshold range of a second number of PECs of the second region.

11. A method comprising:
in a data storage device that comprises a memory, performing:
during a wear leveling process, de-allocating a first region of a group of regions of the memory based on a determination that the first region is associated with a first tag of a set of tags and further based on a comparison of a first bit error rate (BER) associated with the first region and a second BER associated with a second region of the group of regions; and
setting a programming voltage for a write operation associated with the first region based on the first region being associated with the first tag.

12. A data storage device comprising:
a memory including a first group of storage elements and a second group of storage elements; and
a controller coupled to the memory, wherein the controller is configured to maintain a set of tags, wherein the controller is further configured to perform a comparison of a first number of errors associated with the first group of storage elements to a second number of errors associated with the second group of storage elements and to select the first group of storage elements for a wear leveling process based on the first group of storage elements being associated with a particular tag of the set of tags and further based on the comparison, and wherein the controller is further configured to set a programming voltage for a write operation associated with the first group of storage elements based on the first group of storage elements being associated with the particular tag.

13. The data storage device of claim 12, wherein the controller is further configured to perform the comparison in response to determining that a first number of program/erase cycles (PECs) of the first group of storage elements is within a threshold range of a second number of PECs of the second group of storage elements.

14. The data storage device of claim 12, wherein the controller is further configured to select the first group of storage elements for the wear leveling process based on the first group of storage elements and the second group of storage elements both being associated with the particular tag and based on the comparison indicating that the first number of errors is less than the second number of errors.

15. The data storage device of claim 12, wherein the memory has a three-dimensional (3D) memory configuration that is monolithically formed in one or more physical levels of arrays of memory cells having an active area above a silicon substrate, and further comprising circuitry associated with operation of the memory cells.

16. The method of claim 11, further comprising:
comparing a first number of program/erase cycles (PECs) of the first region to a second number of PECs of the second region; and
performing the comparison by comparing the first BER to the second BER in response to determining that the first number is equal to the second number.

17. The method of claim 16, wherein the first region is selected for the wear leveling process in response to determining that the first number is less than the second number.

18. The method of claim 16, further comprising comparing a first PEC condition metric of the first region to a second PEC condition metric of the second region in response to determining that the first BER is equal to the second BER.

19. The method of claim 18, wherein the first PEC condition metric indicates a first programming signal characteristic associated with storage elements of the first region, and wherein the second PEC condition metric indicates a second programming signal characteristic associated with storage elements of the second region.

20. The method of claim 18, wherein the first region is selected for the wear leveling process in response to determining that the first PEC condition metric is less than the second PEC condition metric.

* * * * *